United States Patent [19]

Frame

[11] 4,124,493
[45] Nov. 7, 1978

[54] CATALYTIC OXIDATION OF MERCAPTAN IN PETROLEUM DISTILLATE INCLUDING ALKALINE REAGENT AND SUBSTITUTED AMMONIUM HALIDE

[75] Inventor: Robert R. Frame, Glenview, Ill.

[73] Assignee: UOP Inc., Des Plaines, Ill.

[21] Appl. No.: 880,723

[22] Filed: Feb. 24, 1978

[51] Int. Cl.² .............................................. C10G 27/06
[52] U.S. Cl. .................................................... 208/206
[58] Field of Search ................ 208/206, 207; 252/428, 252/431 N

[56] References Cited

U.S. PATENT DOCUMENTS

| 2,671,048 | 3/1954 | Rosenwald | 208/207 |
| 2,744,854 | 5/1956 | Urban, Jr. | 208/206 |
| 3,164,544 | 1/1965 | Bowers | 208/206 |
| 3,978,137 | 8/1976 | Frame | 208/207 |
| 4,033,860 | 7/1977 | Carlson | 208/206 |
| 4,070,271 | 1/1978 | Carlson et al. | 208/206 |

Primary Examiner—George Crasanakis
Attorney, Agent, or Firm—James R. Hoatson, Jr.; Robert W. Welch; William H. Page, II

[57] ABSTRACT

A process for treating a mercaptan-containing sour petroleum distillate is disclosed. The process comprises contacting said distillate with a supported mercaptan oxidation catalyst at oxidation conditions in the presence of a substituted ammonium halide commingled with an alkaline reagent.

11 Claims, 1 Drawing Figure

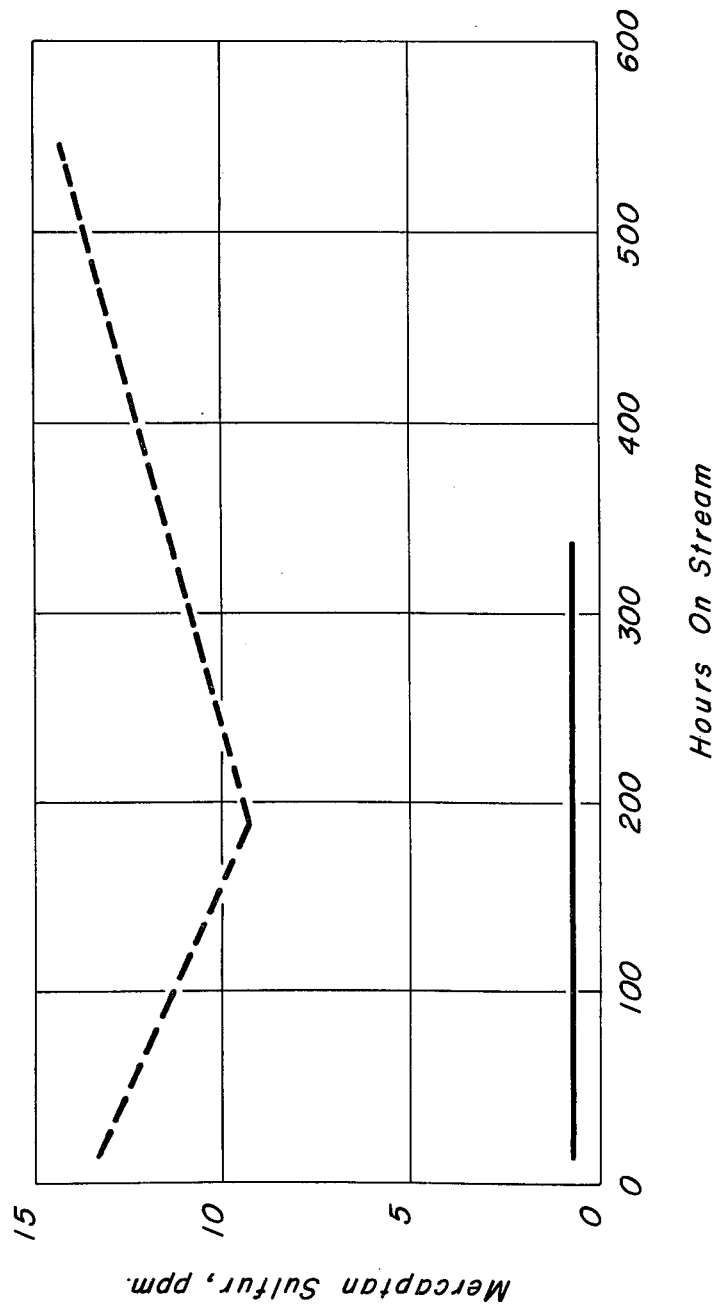

CATALYTIC OXIDATION OF MERCAPTAN IN PETROLEUM DISTILLATE INCLUDING ALKALINE REAGENT AND SUBSTITUTED AMMONIUM HALIDE

Processes for treating sour petroleum distillates wherein the distillate is contacted with a supported mercaptan oxidation catalyst at oxidation conditions in the presence of an alkaline reagent, have become well known and widely practiced in the petroleum refining industry. One such process is described in U.S. Pat. No. 2,988,500. The process is typically designed to effect the oxidation of offensive mercaptans contained in a sour petroleum distillate with the formation of innocuous disulfides—a process commonly referred to as sweetening. The oxidizing agent is most often air admixed with the sour petroleum distillate to be treated, and the alkaline reagent is most often sodium hyroxide in aqueous solution, the aqueous caustic solution being charged continuously to the process, or intermittently as required.

Depending on the source of the petroleum from which the distillate was derived, the boiling range of the distillate itself, and possibly the method of processing the petroleum to produce the distillate, the distillates will vary widely with respect to the concentration as well as the complexity of the mercaptans contained therein. In general, the lower boiling petroleum distillates, including natural, straight run and cracked gasoline, contain the lower boiling, less complex mercaptans and are more readily treated in the sweetening process. The process of the present invention is particularly adapted to the treatment of petroleum distillates boiling in excess of 135° C., for example, kerosene, jet fuel, fuel oil, naphtha, and the like. These higher boiling distillates generally contain the more difficultly oxidizable mercaptans, i.e., the highly hindered branched chain and aromatic thiols—especially the higher molecular weight tertiary and polyfunctional mercaptans. As will become apparent with reference to the examples appended hereto, the improvement derived from the practice of this invention is particularly notable when treating the described higher boiling sour petroleum distillates.

It is an object of this invention to present a novel process for treating a sour petroleum distillate and effecting improved oxidation of the mercaptans contained therein. It is a further object to present a novel process particularly adapted to the treating of higher boiling petroleum distillates containing difficulty oxidizable mercaptans.

The present invention embodies an improved process for treating a mercaptan-containing sour petroleum distillate which comprises contacting said distillate with a supported mercaptan oxidation catalyst at oxidation conditions in the presence of an alkaline reagent and a substituted ammonium halide represented by the structural formula

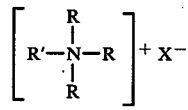

wherein R is a hydrocarbon radical containing up to about 20 carbon atoms and selected from the group consisting of alkyl, cycloalkyl, aryl, aralkyl and alkaryl, R' is a substantially straight chain alkyl radical containing from about 5 to about 20 carbon atoms, and X is chloride, bromide, fluoride or iodide.

A more specific embodiment concerns a process which comprises contacting said distillates with a charcoal-supported metal phthalocyanine catalyst at oxidation conditions in the presence of a caustic solution and a dimethylbenzylalkylammonium chloride wherein the alkyl substituent is a substantially straight chain alkyl radical containing from about 5 to about 20 carbon atoms.

A still more specific embodiment of this invention relates to a process for treating a sour petroleum distillate which comprises contacting said distillate admixed with air with a charcoal-supported cobalt phthalocyanine monosulfonate catalyst, and maintaining said distillate in contact with said catalyst for a time equivalent to a liquid hourly space velocity of from about 0.1 to about 10 in the presence of a dimethylbenzylalkylammonium chloride commingled with sodium hydroxide in aqueous solution in a mole ratio of from about 0.001:1 to about 1:1, the alkyl substituent of said dimethylbenzylalkylammonium chloride being a substantially straight chain alkyl radical containing from about 12 to about 18 carbon atoms.

Other objects and embodiments of this invention will become apparent in the following detailed specification.

In the process of sweetening a sour petroleum distillate, it has heretofore been the practice to oxidize the mercaptans contained therein in the presence of an alkaline reagent. The supported mercaptan oxidation catalyst is typically initially saturated with the alkaline reagent, and the alkaline reagent thereafter passed in contact with the catalyst bed, continuously or intermittently as required, admixed with the sour petroleum distillate. Any suitable alkaline reagent may be employed. An alkali metal hydroxide in aqueous solution, e.g., sodium hydroxide in aqueous solution, is most often employed. The solution may further comprise a solubilizer to promote mercaptan solubility, e.g., alcohol, and especially methanol, ethanol, n-propanol, isopropanol, etc., and also phenols, cresols, and the like. A particularly preferred alkaline reagent is a caustic solution comprising from about 2 to about 30 wt. % sodium hydroxide. The solubilizer, when employed, is preferably methanol, and the alkaline solution may suitably comprise from about 2 to about 100 vol. % thereof. While sodium hydroxide and potassium hydroxide constitute the preferred alkaline reagents, others including lithium hydroxide, rubidium hydroxide and cesium hydroxide are also suitably employed.

Pursuant to the present invention, a substituted ammonium halide is commingled with the aforementioned alkaline reagent to provide improved oxidation and conversion of mercaptans to disulfides. The substituted ammonium halide, preferably a dimethylbenzylalkylammonium chloride, is suitably employed in from about 0.001:1 to about a 1:1 mole ratio with an alkali metal hydroxide or other alkaline reagent. The substituted ammonium halides herein contemplated are represented by the structural formula

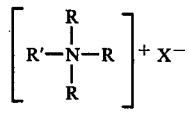

wherein R is a hydrocarbon radical containing up to about 20 carbon atoms and selected from the group consisting of alkyl, cycloalkyl, aryl, aralkyl and alkaryl, R' is a substantially straight chain alkyl radical containing from about 5 to about 20 carbon atoms, and X is chloride, bromide, fluoride or iodide. Suitable substituted ammonium halides thus include dimethylphenylpentylammonium chloride, diethylphenylpentylammonium chloride, dipropylphenylpentylammonium chloride, dimethylphenylhexylammonium chloride, diethylphenylhexylammonium chloride, dipropylphenylhexylammonium chloride, dimethylphenyloctylammonium chloride, diethylphenyloctylammonium chloride, dipropylphenyloctylammonium chloride, dimethylphenyldecylammonium chloride, diethylphenyldecylammonium chloride, dipropylphenyldecylammonium chloride, dimethylphenyldodecylammonium chloride, diethylphenyldodecylammonium chloride, dipropylphenyldodecylammonium chloride, dimethylphenyltetradecylammonium chloride, diethylphenyltetradecylammonium chloride, dipropylphenyltetradecylammonium chloride, dimethylphenylhexadecylammonium chloride, diethylphenylhexadecylammonium chloride, dipropylphenylhexadecylammonium chloride, dimethylphenyloctadecylammonium chloride, diethylphenyloctadecylammonium chloride, dipropylphenyloctadecylammonium chloride, dimethylphenyleicosylammonium chloride, diethylphenyleicosylammonium chloride, dipropylphenyleicosylammonium chloride, dimethylbenzylpentylammonium chloride, diethylbenzylpentylammonium chloride, dipropylbenzylpentylammonium chloride, dimethylbenzylhexylammonium chloride, diethylbenzylhexylammonium chloride, dipropylbenzylhexylammonium chloride, dimethylbenzyloctylammonium chloride, diethylbenzyloctylammonium chloride, dipropylbenzyloctylammonium chloride, dimethylbenzyldecylammonium chloride, diethylbenzyldecylammonium chloride, dipropylbenzyldecylammonium chloride, dimethylbenzyldodecylammonium chloride, diethylbenzyldodecylammonium chloride, dipropylbenzyldodecylammonium chloride, dimethylbenzyltetradecylammonium chloride, diethylbenzyltetradecylammonium chloride, dipropylbenzyltetradecylammonium chloride,, dimethylbenzylhexadecylammonium chloride, diethylbenzylhexadecylammonium chloride, dipropylbenzylhexadecylammonium chloride, dimethylbenzyloctadecylammonium chloride, diethylbenzyloctadecylammonium chloride, dipropylbenzyloctadecylammonium chloride, dimethylbenzyleicosylammonium chloride, diethylbenzyleicosylammonium chloride, dipropylbenzyleicosylammonium chloride, dimethyltolylpentylammonium chloride, diethyltolylpentylammonium chloride, dipropyltolylpentylammonium chloride, dimethyltolylhexylammonium chloride, diethyltolylhexylammonium chloride, dipropyltolylhexylammonium chloride, dimethyltolyloctylammonium chloride, diethyltolyloctylammonium chloride, dipropyltolyloctylammonium chloride, dimethyltolyldecylammonium chloride, diethyltolyldecylammonium chloride, dipropyltolyldecylammonium chloride, dimethyltolyldodecylammonium chloride, diethyltolyldodecylammonium chloride, dipropyltolyldodecylammonium chloride, dimethyltolyltetradecylammonium chloride, diethyltolyltetradecylammonium chloride, dipropyltolyltetradecylammonium chloride, dimethyltolylhexadecylammonium chloride, diethyltolylhexadecylammonium chloride, dipropyltolylhexadecylammonium chloride, dimethyltolyloctadecylammonium chloride, diethyltolyloctadecylammonium chloride, dipropyltolyloctadecylammonium chloride, dimethyltolyleicosylammonium chloride, diethyltolyleicosylammonium chloride, dipropyltolyleicosylammonium chloride, dimethylcyclohexyloctylammonium chloride, diethylcyclohexyloctylammonium chloride, dipropylcyclohexyloctylammonium chloride, dimethylcyclohexyldecylammonium chloride, diethylcyclohexyldecylammonium chloride, dipropylcyclohexyldecylammonium chloride, dimethylcyclohexyldodecylammonium chloride, diethylcyclohexyldodecylammonium chloride, dipropylcyclohexyldodecylammonium chloride, dimethylcyclohexyltetradecylammonium chloride, diethylcyclohexyltetradecylammonium chloride, dipropylcyclohexyltetradecylammonium chloride, dimethylcyclohexylhexadecylammonium chloride, diethylcyclohexylhexadecylammonium chloride, dipropylcyclohexylhexadecylammonium chloride, dimethylcyclohexyloctadecylammonium chloride, diethylcyclohexyloctadecylammonium chloride, dipropylcyclohexyloctadecylammonium chloride, trimethyloctylammonium chloride, triethyloctylammonium chloride, tripropyloctylammonium chloride, and the like.

The preferred dimethylbenzylalkylammonium chlorides are commercially available from the Mason Chemical Company under the tradename Maquats. However, said dimethylbenzylalkylammonium chlorides can be prepared by initially reacting ammonia and a $C_{12}$–$C_{18}$ carboxylic acid in contact with silica gel at about 500° C. to form a $C_{12}$–$C_{18}$ nitrile. The nitrile is then reduced with hydrogen in contact with a nickel catalyst at about 140° C. The resulting $C_{12}$–$C_{18}$ amine is separated from the reaction mixture and reacted with a 2 molar excess of methyl chloride. After neutralization of the reaction mixture, the amine is further reacted with 1 mole equivalent of benzylchloride to yield the desired dimethylbenzylalkylammonium chloride. The methyl chloride as well as the benzylchloride, is suitably reacted with the amine in methanolic solution at a temperature of about 150° C. The product can be used as is or further treated over activated charcoal to remove impurities.

The catalyst employed in the practice of this invention can be any of the various catalysts known to the treating art as effective to catalyze the oxidation of mercaptans contained in a sour petroleum distillate with the formation of polysulfide oxidation products. Said catalysts include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the like. Metal phthalocyanines are a preferred class of mercaptan oxidation catalysts.

The metal phthalocyanines employed to catalyze the oxidation of mercaptans contained in sour petroleum distillates generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate or a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

For use in the fixed bed treating operation, the metal phthalocyanine catalyst can be adsorbed or impregnated on a solid adsorbent support in any conventional or otherwise convenient manner. In general, the support or carrier material in the form of spheres, pills, pellets, granules or other particles of uniform or irregular shape and size, is dipped, soaked, suspended or otherwise immersed in an aqueous or alcoholic solution and/or dispersion of the metal phthalocyanine catalyst, or the aqueous or alcoholic solution and/or dispersion may be sprayed onto, poured over, or otherwise contacted with the adsorbent support. In any case, the aqueous solution and/or dispersion is separated, and the resulting composite is allowed to dry under ambient temperature conditions, or dried at an elevated temperature in an oven or in a flow of hot gases, or in any other suitable manner.

In general, up to about 25 wt. % metal phthalocyanine can be adsorbed on the solid adsorbent support or carrier material and still form a stable catalytic composite. A lesser amount in the range of from about 0.1 to about 10 wt. % generally forms a suitably active catalytic composite; although the activity advantage heretofore derived from metal phthalocyanine concentrations in excess of about 2 wt. % has not warranted the use of higher concentrations. However, in view of the significant activity increase derived from the use of the substituted ammonium halides of this invention in conjunction with minimal metal phthalocyanine concentrations, it is contemplated that the higher concentrations will become effective to promote a further increase in the rate of mercaptan oxidation, particularly with regard to the hard to treat sour petroleum distillates.

One suitable and convenient method for adsorbing the metal phthalocyanine catalyst in a solid adsorbent support or carrier material comprises predisposing the support or carrier material in the distillate treating zone or chamber as a fixed bed, and passing the metal phthalocyanine solution and/or dispersion through the bed in order to form the catalytic composite in situ. This method allows the solution and/or dispersion to be recycled one or more times to achieve a desired concentration of the metal phthalocyanine on the adsorbent support. In still another method, the adsorbent support may be predisposed in said treating chamber and the chamber thereafter filled with the metal phthalocyanine solution and/or dispersion to soak the support for a predetermined period, thereby forming the catalytic composite in situ.

The metal phthalocyanine catalyst can be adsorbed or impregnated on any of the well-known solid adsorbent materials generally utilized as a catalyst support. Preferred adsorbent materials include the various charcoals produced by the destructive distillation of wood, peat, lignite, nutshells, bones, and other carbonaceous matter, and preferably such charcoals as have been heat treated or chemically treated or both, to form a highly porous particle structure of increased adsorbent capacity and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc. or combinations thereof like silica-alumina, silica-zirconia, alumina-zirconia, etc. Any particular solid adsorbent material is selected with regard to its ability under conditions of its intended use. For example, in the treatment of a sour petroleum distillate heretofore described, the solid adsorbent carrier material should be insoluble in, and otherwise inert to, the petroleum distillate at the alkaline reaction conditions existing in the treating zone. In the latter case, charcoal, and particularly activated charcoal, is preferred because of its capacity for metal phthalocyanine, and because of its stability under treating conditions.

The process of this invention can be effected in accordance with prior art treating conditions. The process is usually effected at ambient temperature conditions, although higher temperatures up to about 105° C. are suitably employed. Pressures of up to about 1000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The following examples are presented in illustration of one preferred embodiment of this invention and are not intended as an undue limitation of a generally broad scope of the invention as set out in the appended claims.

EXAMPLE I

The sour petroleum distillate treated in this and the subsequent example was a kerosene fraction boiling in the 352°–424° F. range at 742mm. The kerosene had a specific gravity of 0.8081 and contained 448 ppm mercaptan sulfur. The kerosene was charged downflow through 100cc of a charcoal supported cobalt phthalocyanine monosulfonate catalyst disposed as a fixed bed in a vertical tubular reactor. The catalyst bed consisted of about 1 wt. % cobalt phthalocyanine monosulfonate adsorbed on 10-30 mesh activated charcoal particles. The kerosene was charged at a liquid hourly space velocity of about 0.5 under 45 psig of air—sufficient to provide about twice the stoichiometric amount of oxygen required to oxidize the mercaptans contained in the kerosene. In this example, representing prior art practice, the catalyst bed was initially wetted with about 10cc of an 8% aqueous sodium hydroxide solution, 10cc of said solution being subsequently charged to the catalyst bed at 12 hour intervals admixed with the kerosene charged thereto. The treated kerosene was analyzed periodically for mercaptan sulfur. In the attached drawing (FIG. 1) the mercaptan sulfur content of the treated kerosene is plotted against the number of hours on stream (broken line).

EXAMPLE II

In this example, the described mercaptan-containing kerosene fraction was treated substantially as described in Example I except that a dimethylbenzyl-n-alkylammonium chloride was commingled with the aqueous sodium hydroxide solution, in accordance with the present invention, to provide a 0.01 molar dimethylbenzyl-n-alkylammonium chloride solution. The dimethylbenzyl-n-alkylammonium chloride comprise dimethylbenzyldodecylammonium chloride: (61%)
dimethylbenzyltetradecylammonium chloride: (23%)
dimethylbenzylhexadecylammonium chloride: (11%)
dimethylbenzyloctadecylammonium chloride: (5%)

The treated kerosene was again analyzed periodically for mercaptan sulfur. The mercaptan sulfur content of the treated kerosene plotted against the number of hours on stream (solid line of FIG. 1) gives evidence of the substantial activity improvement and exceptional activity stability resulting from the practice of this invention.

I claim as my invention:

1. A process for treating a mercaptan-containing sour petroleum distillate to oxidize the mercaptan present in said distillate, said process comprises contacting said distillate with (a) a supported mercaptan oxidation catalyst (b) an oxidizing agent, an alkaline agent and (d) a substituted ammonium halide represented by the structural formula

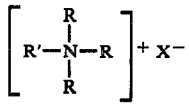

wherein R is a hydrocarbon radical containing up to about 20 carbon atoms and selected from the group consisting of alkyl, cycloalkyl, aryl, aralkyl and alkaryl, $R^1$ is a substantially straight chain alkyl radical containing from about 5 to about 20 carbon atoms, and X is a chloride, fluoride, bromide or iodide.

2. The process of claim 1 further characterized in that said alkaline reagent is sodium hydroxide in from about a 2 wt. % to about a 30 wt. % aqueous solution.

3. The process of claim 1 further characterized in that said substituted ammonium halide is employed in from about a 0.001:1 to about a 1:1 mole ratio with said alkaline reagent.

4. The process of claim 1 further characterized in that said supported mercaptan oxidation catalyst is a charcoal-supported cobalt phthalocyanine monosulfonate.

5. The process of claim 1 further characterized in that said distillate is maintained in contact with said catalyst for a time equivalent to a liquid hourly space velocity of from about 0.5 to about 10.

6. The process of claim 1 further characterized in that said substituted ammonium halide is a substituted ammonium chloride.

7. The process of claim 1 further characterized in that said substituted ammonium halide is a dimethylbenzylalkylammonium halide wherein the alkyl substituent contains from about 12 to about 18 carbon atoms.

8. The process of claim 1 further characterized in that said substituted ammonium halide is dimethylbenzyldodecylammonium chloride.

9. The process of claim 1 further characterized in that said substituted ammonium halide is dimethylbenzyltetradecylammonium chloride.

10. The process of claim 1 further characterized in that said substituted ammonium halide is dimethylbenzylhexadecylammonium chloride.

11. The process of claim 1 further characterized in that said substituted ammonium halide is dimethylbenzyloctadecylammonium chloride.

* * * * *